US008121098B2

(12) United States Patent
Rudolf et al.

(10) Patent No.: US 8,121,098 B2
(45) Date of Patent: **\*Feb. 21, 2012**

(54) METHOD AND SYSTEM FOR TRANSFERRING INFORMATION BETWEEN NETWORK MANAGEMENT ENTITIES OF A WIRELESS COMMUNICATION SYSTEM

(75) Inventors: Marian Rudolf, Montreal (CA); Stephen G. Dick, Nesconset, NY (US); Teresa Joanne Hunkeler, Montreal (CA); Shamim Akbar Rahman, Montreal (CA); Joseph A. Kwak, Bolingbrook, IL (US)

(73) Assignee: InterDigital Technology Corporation, Wilmington, DE (US)

( * ) Notice: Subject to any disclaimer, the term of this patent is extended or adjusted under 35 U.S.C. 154(b) by 1340 days.

This patent is subject to a terminal disclaimer.

(21) Appl. No.: 10/890,571

(22) Filed: Jul. 14, 2004

(65) Prior Publication Data
US 2005/0111403 A1    May 26, 2005

Related U.S. Application Data

(60) Provisional application No. 60/487,830, filed on Jul. 16, 2003, provisional application No. 60/488,542, filed on Jul. 17, 2003.

(51) Int. Cl.
*H04W 4/00* (2009.01)

(52) U.S. Cl. .......................................... 370/338; 370/328

(58) Field of Classification Search .................. 370/328, 370/252, 318, 338, 349, 392, 401, 395.5; 709/229, 225, 224; 455/561, 452.1
See application file for complete search history.

(56) References Cited

U.S. PATENT DOCUMENTS 5,651,007 A  *  7/1997  Warren et al. ................. 370/431
(Continued)

FOREIGN PATENT DOCUMENTS

EP            1206070            5/2002
(Continued)

OTHER PUBLICATIONS

"Draft Supplement to Standard for Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS)," IEEE Std 802.11e/D4.4, Jun. 2003.

(Continued)

*Primary Examiner* — Kwang B Yao
*Assistant Examiner* — Syed M Bokhari
(74) *Attorney, Agent, or Firm* — Volpe and Koenig, P.C.

(57) ABSTRACT

A method and wireless communication system for transferring management information. The system includes at least one access point (AP) including a first management entity and a second management entity, and at least one wireless transmit/receive unit (WTRU) including a third management entity and a fourth management entity. The AP transmits a management information base (MIB) information request action frame including a category field and an action details field to the WTRU. In response to receiving the information request action frame, the WTRU determines whether or not to provide management information to the AP. When the WTRU provides management information to the AP, the WTRU compiles management information stored in a MIB located in the WTRU and transmits a MIB information report action frame to the AP. The MIB lists a plurality of tables containing information associated with radio resource management (RRM) and at least one table containing physical layer measurements.

13 Claims, 6 Drawing Sheets

U.S. PATENT DOCUMENTS

| | | | |
|---|---|---|---|
| 6,606,310 B1* | 8/2003 | Vialen et al. ............ | 370/338 |
| 6,614,797 B1 | 9/2003 | Hippelainem | |
| 6,804,222 B1 | 10/2004 | Lin et al. | |
| 6,850,981 B1 | 2/2005 | Ho et al. | |
| 6,862,270 B1 | 3/2005 | Ho | |
| 6,950,397 B1 | 9/2005 | Ho et al. | |
| 6,970,422 B1 | 11/2005 | Ho et al. | |
| 6,985,465 B2 | 1/2006 | Cervello et al. | |
| 6,999,442 B1 | 2/2006 | Ho et al. | |
| 7,020,438 B2 | 3/2006 | Sinivaara et al. | |
| 7,031,287 B1 | 4/2006 | Ho et al. | |
| 7,039,032 B1 | 5/2006 | Ho et al. | |
| 7,120,092 B2 | 10/2006 | del Prado Pavon et al. | |
| 2001/0037395 A1 | 11/2001 | Sabat et al. | |
| 2002/0067696 A1 | 6/2002 | Ho | |
| 2002/0141376 A1 | 10/2002 | Kandala | |
| 2002/0172186 A1 | 11/2002 | Larsson | |
| 2002/0188723 A1* | 12/2002 | Choi et al. ............ | 709/225 |
| 2003/0035399 A1 | 2/2003 | Ishibashi et al. | |
| 2003/0081547 A1 | 5/2003 | Ho | |
| 2003/0081583 A1* | 5/2003 | Kowalski ............ | 370/338 |
| 2003/0091066 A1 | 5/2003 | Choi et al. | |
| 2003/0093526 A1 | 5/2003 | Nandagopalan et al. | |
| 2003/0125087 A1* | 7/2003 | Shimizu ............ | 455/561 |
| 2003/0137993 A1 | 7/2003 | Odman | |
| 2003/0156586 A1* | 8/2003 | Lee et al. ............ | 370/392 |
| 2003/0214905 A1 | 11/2003 | Solomon et al. | |
| 2004/0008690 A1* | 1/2004 | Kandala ............ | 370/395.21 |
| 2004/0042435 A1 | 3/2004 | Soomro et al. | |
| 2004/0047351 A1 | 3/2004 | Del Prado Pavon et al. | |
| 2004/0090982 A1* | 5/2004 | Xu ............ | 370/447 |
| 2004/0097253 A1 | 5/2004 | Malkamaki | |
| 2004/0103278 A1 | 5/2004 | Abhishek et al. | |
| 2004/0114535 A1 | 6/2004 | Hoffmann et al. | |
| 2004/0180675 A1 | 9/2004 | Choi et al. | |
| 2004/0196846 A1* | 10/2004 | Salonen ............ | 370/392 |
| 2004/0202141 A1* | 10/2004 | Sinivaara et al. ............ | 370/338 |
| 2004/0203828 A1* | 10/2004 | Mirchandani et al. ...... | 455/452.1 |
| 2004/0236702 A1* | 11/2004 | Fink et al. ............ | 705/73 |
| 2004/0246932 A1* | 12/2004 | Fischer ............ | 370/338 |
| 2005/0021707 A1 | 1/2005 | Fendt | |
| 2005/0025181 A1 | 2/2005 | Nazari | |
| 2005/0076112 A1* | 4/2005 | Ravindran et al. ............ | 709/224 |
| 2005/0117602 A1 | 6/2005 | Carrigan et al. | |
| 2005/0174973 A1 | 8/2005 | Kandala et al. | |
| 2006/0014492 A1 | 1/2006 | Del Prado Pavon et al. | |
| 2006/0156184 A1 | 7/2006 | Kim et al. | |

FOREIGN PATENT DOCUMENTS

| | | |
|---|---|---|
| EP | 1309139 | 5/2003 |
| JP | 2003-060647 | 2/2003 |
| WO | 03/043265 | 5/2003 |

OTHER PUBLICATIONS

"Draft Supplement to Standard for Information Technology—Telecommunications and Information Exhange Between Systems—LAN/MAN Specific Requirements—Part 11: Wireless Medium Access Control (MAC) and physical layer (PHY) specifications: Spectrum and Transmit Power Management extensions in the 5GHz band in Europe." P802.11/D3, May 2003.

"Information technology—Telecommunications and information exchange between systems—Local and metropolitan area networks—Specific requirements—Part 11: Wireless LAN Medium Access Control (MAC) and Physical Layer (PHY) Specifications." ANSI/IEEE std 802.111, 1999 Edition (R2003).

"Draft Recommended Practice for Multi-Vendor Access Point Interoperability via an Inter-Access Point Protocol Across Distribution Systems Supporting IEEE 802.11 Operation." IEEE Std. 802.11f/D3.1, Apr. 2002.

"Draft Supplement to Standard for Information Technology—Telecommunications and Information Exchange Between Systems—LAN/MAN Specific Requirements—Part 11: Wireless Medium Access Control (MAC) and physical layer (PHY) specifications: Spectrum and Transmit Power Management extensions in the 5GHz band in Europe." P802.11h/D3, May 2003.

"Draft Supplement to Standard for Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)." IEEE Std 802.11e/D4.4, Jun. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.1, Mar. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.15, Jun. 2004.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.9, Nov. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.10, Nov. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.4, Jul. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.3, Jul. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.2, May 2003.

"Information technology—Telecommunications and information exchange between systems—Local and metropolitan area networks—Specific requirements—Part 11: Wireless LAN Medium Access Control (MAC) and Physical Layer (PHY) Specifications." ANSI/IEEE Std. 802.11, 1999 Edition (R2003).

"Part 11: Wireless LAN MAC and PHY Specifications." IEEE Std. 802.11-1997. pp. 100-151.

Black et al. "A Framework for Radio Resource Measurement (RRM)." Jan. 14, 2003. doc.: IEEE 802.11-03/080r0.

Black et al. "A Framework for RRM." Jan. 2003. doc.: IEEE 802.11-03/080r0A.

Black et al. "Proposals for STA Statistics Gathering, Distribution of RRM Information & Measurement Thresholds." May 12, 2003. doc.: IEEE 802.11-03/338r0.

Paine, Richard H. "IEEE 802.11. Radio Resource Measurement Requirements and Issues." Oct. 19, 2002.

Paine, Richard H. "IEEE P802.11 Wireless LANs. Radio Resource Measurement Issues." Jan. 2003. doc.: IEEE 802.11-03/134r0.

Paine, Richard. "Radio Resource Measurement Tutorial. " Nov. 2002. doc.: IEEE 802.11-02/651r0.

Paine, Richard H. "IEEE 802.11. Radio Resource Measurement Requirements and Issues." Oct 19, 2002.

Paine, Richard. "Radio Resource Measurement Tutorial." Nov. 2002. doc.: IEEE 802.11-02/651r0.

"Draft Supplement to Standard for Information Technology—Telecommunications and Information Exhanges Between Systems—LAN/MAN Specific Requirements—Part 11: Wireless Medium Access Control (MAC) and physical layer (PHY) specifications: Spectrum and Transmit Power Management extensions in 5GHz band in Europe." P802.11h/D3, May 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.15, Jun. 2003.

"Information technology—Telecommunications and information exchange between systems—Local and metropolitan area networks—Specific requirements—Part 11: Wireless LAN Medium Access Control (MAC) and Physical Layer (PHY) Specifications." ANSI/IEEE Std 802.11, 1999 Edition (R2003).

Kwak et al., "IEEE P802.11 Wireless LANs: Retrieving MIB contents from STA's," IEEE802.11-03/555r0 (Jul. 2003).

"Information technology—Telecommunications and information exchange between systems—Local and metropolitan area networks—Specific requirements—Part 11: Wireless LAN Medium Access Control (MAC) and Physical Layer (PHY) Specifications" ANSI/IEEE Std 802.11, 1999 Edition (R2003).

* cited by examiner

METHOD AND SYSTEM FOR TRANSFERRING INFORMATION BETWEEN NETWORK MANAGEMENT ENTITIES OF A WIRELESS COMMUNICATION SYSTEM

CROSS REFERENCE TO RELATED APPLICATION(S)

This application claims priority from U.S. provisional application Nos. 60/487,830 filed on Jul. 16, 2003, and 60/488,542 filed on Jul. 17, 2003, which are incorporated by reference as if fully set forth.

FIELD OF INVENTION

The present invention is related to wireless communication systems. More particularly, the present invention is related to a method and system for communicating management information between a wireless transmit/receive unit (WTRU) and an access point (AP) to optimize radio resource management (RRM).

BACKGROUND

Wireless local area networks (WLANs) have become more popular because of their convenience and flexibility. As new applications for such networks are being developed, their popularity is expected to significantly increase.

Institute of Electrical and Electronics Engineers (IEEE) working groups have defined an IEEE 802.11 baseline standard having extensions which are intended to provide higher data rates and other network capabilities. Under the IEEE 802.11 standards, network entities include a management information base (MIB). The MIB may be either a media access control (MAC) layer MIB or a physical (PHY) layer MIB. Data entries in a MIB table use IEEE 802.11 standards.

Network management entities (NMEs), connected to a WLAN, communicate with each other by sending frames. There are three types of MAC frames defined by the IEEE 802.11 standards: 1) data frames; 2) control frames; and 3) management frames. There are also sub-types for each of these frames. For example, an action frame is a sub-type of a management frame. Action frames are further defined by categories. Currently, several action frame categories are defined as follows: 0—spectrum management; 1—quality of service management; 2—direct link protocol; and 3—radio measurement.

A service primitive is an internal signaling message used for inter-layer or inter-protocol entity exchanges, such as between a station management entity (SME) and a MAC layer management entity (MLME), with standardized message contents. Although a particular format of message is not specified by the standards, the standards do specify the content. Service primitives are typically used to initiate, confirm or report a particular action, such as by sending a particular frame for management purposes from one WTRU to another WTRU.

In accordance with IEEE 802.11 standards, an SME is incorporated into the WTRU in order to provide correct MAC operation. The SME is a layer-independent entity that may be viewed as residing in a separate management plane or as residing "off to the side." Thus, the SME may be viewed as being responsible for such functions as the gathering of layer-dependent status from the various layer management entities, and similarly setting the value of layer-specific parameters. The SME typically performs such functions on behalf of general system management entities and implements standard management protocols.

Furthermore, according to IEEE 802.11 standards, a WTRU contains configuration settings in the MIB that control its behavior. It is important for an AP to be able to understand the configuration of each WTRU in order to interpret the WTRU's behavior and to improve performance in the context of WLAN RRM. For example, a WTRU keeps track, in its MIB, of successfully received but not decodable data frames. This is important information for an AP to provide a minimum level of quality of service to the WTRU.

RRM is one of the most important aspects in WLAN management. A WLAN can achieve significant performance enhancement by performing RRM, including in-band interference mitigation and frequency re-use. The MIB, as currently defined under IEEE 802.11 standards, does not contain enough information to support WLAN RRM. Therefore, there is a need for an improved MIB data structure to assist the inter-working of a WTRU and an AP in terms of WLAN RRM.

The request/report messaging and retrieving of a WTRU's physical measurement data or MAC performance statistics of all sorts in a basic service set (BSS) are key parameters for interference mitigation and RRM. However, these physical measurements or MAC performance statistics are not passed from an L1 PHY or L2 MAC protocol entity to the SME, which serves as an interface to an external WLAN RRM entity. The SME typically contains interface software to read/write into the MIBs. For example, upon receiving a command from a simple network management protocol (SNMP), a read of a particular MIB entry is reported back to the SNMP.

In conventional systems, the MIB of the AP does not currently contain the physical measurement data or MAC performance statistics stored in the MIB of the WTRU. Furthermore, the NMEs do not know what is in the WTRU's MIB, because in almost all cases, only the AP has implemented a management protocol (e.g., an SNMP) to read/write to a MIB in the AP, but not to the MIB in the WTRU.

SUMMARY

The present invention is method and wireless communication system for transferring management information. The system includes at least one access point (AP) including a first management entity and a second management entity, and at least one wireless transmit/receive unit (WTRU) including a third management entity and a fourth management entity. The AP transmits a management information base (MIB) information request action frame including a category field and an action details field to the WTRU. In response to receiving the information request action frame, the WTRU determines whether or not to provide management information to the AP. When the WTRU provides management information to the AP, the WTRU compiles management information stored in a MIB located in the WTRU and transmits a MIB information report action frame to the AP. The MIB lists a plurality of tables containing information associated with radio resource management (RRM) and at least one table containing physical layer measurements.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Figure 1A:
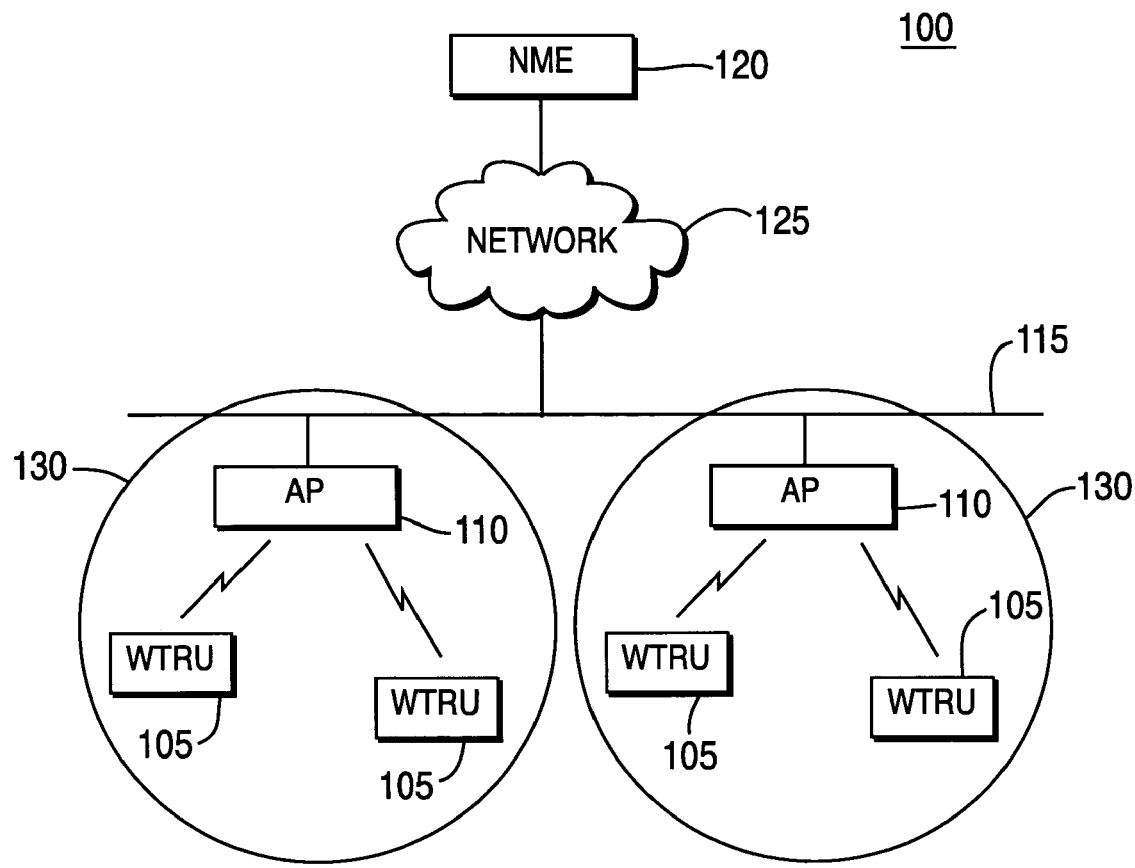
FIG. 1A is a block diagram of a wireless communication system operating in accordance with the present invention.

Hereafter, a WTRU includes but is not limited to a user equipment, a mobile station, a fixed or mobile subscriber unit, a pager, or any other type of device capable of operating in a wireless environment. When referred to hereafter, an AP includes but is not limited to a base station, a Node-B, a site controller, or any other type of interfacing device in a wireless environment.

The present invention will be described with reference to the drawing figures wherein like numerals represent like elements throughout. The present invention applies as add-on to the WLAN IEEE 802.11 standards (802.11 baseline, 802.11a, 802.11b, and 802.11g), and also applies to IEEE 802.11e, 802.11h and 802.16.

The present invention may be further applicable to Time Division Duplex (TDD), Frequency Division Duplex (FDD), and Time Division Synchronous CDMA (TDSCDMA), as applied to a Universal Mobile Telecommunications System (UMTS), CDMA 2000 and CDMA in general, but is envisaged to be applicable to other wireless systems as well.

The features of the present invention may be incorporated into an integrated circuit (IC) or be configured in a circuit comprising a multitude of interconnecting components.

FIG. 1A is a block diagram of a wireless communication system 100 including a plurality of WTRUs 105, a plurality of APs 110, a distribution system (DS) 115, an NME 120 and a network 125. The WTRUs 105 and APs 110 form respective base service sets (BSSs) 130. The BSSs 130 and the DS 115 form an extended service set (ESS). The APs 110 are connected to the NME 120 through the network 125. The wireless communication system 100 may be a WLAN.

Figure 1B:
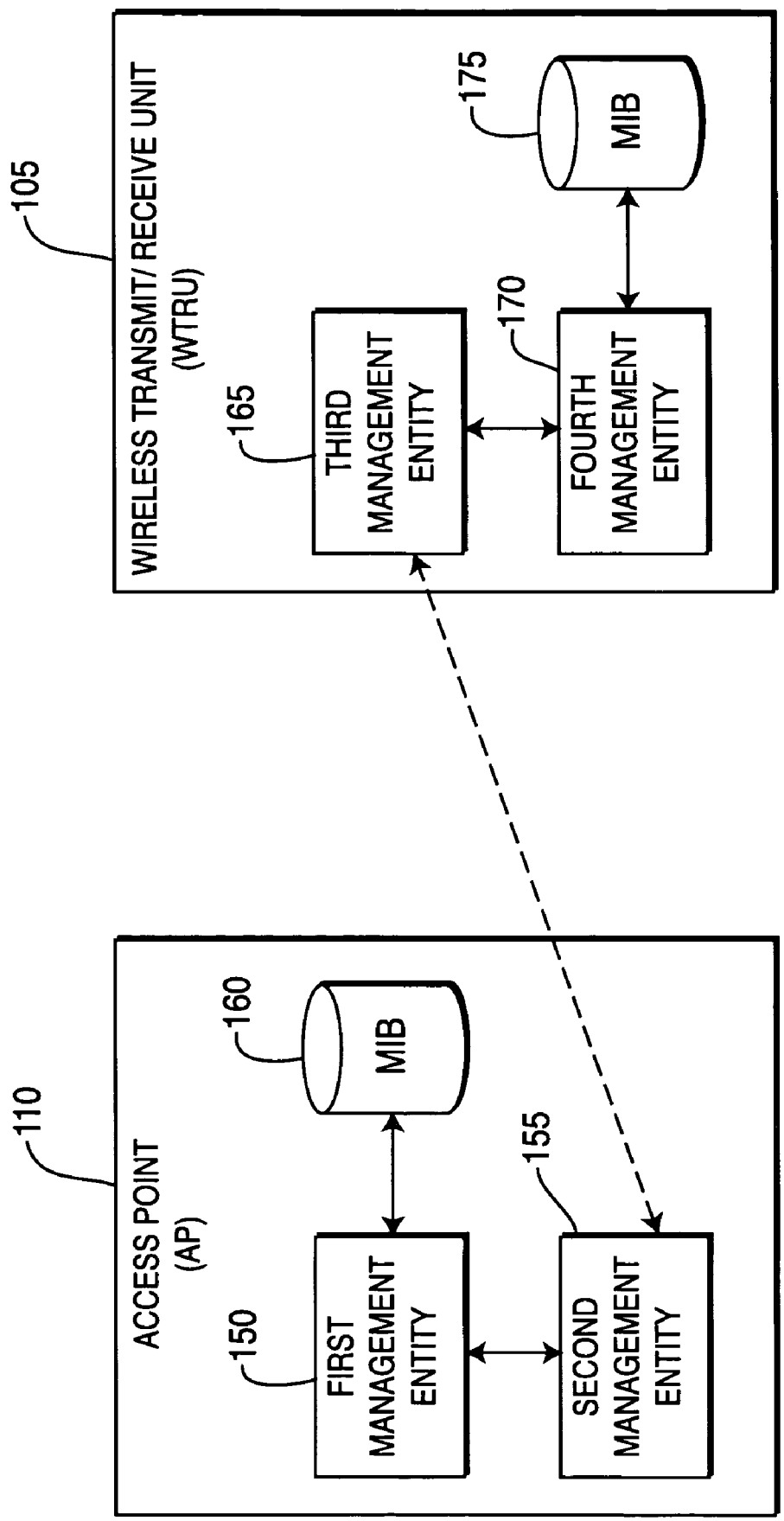
FIG. 1B is a detailed block diagram illustrating the configuration of an AP and WTRU used in the wireless communication system of FIG. 1A.

FIG. 1B is a detailed block diagram illustrating the configuration of the APs 110 and WTRUs 105 used in the wireless communication system 100. The AP 110 includes a first management entity 150, a second management entity 155 and a first MIB 160. The WTRU 105 includes a third management entity 165, a fourth management entity 170 and a second MIB 175. The MIBs 160 and 175 consist of one or more storage devices (e.g., a counter, a register or other memory device) used to store configuration parameters, performance metrics and fault indicators.

The first management entity 150 may be an SME. The second management entity 155 may be an MLME. The third management entity 165 may be an MLME. The fourth management entity 170 may be an SME.

The present invention expands the data content of the MIB 160 in the AP 110 such that it stores the contents of the MIB 175 in the WTRU 105. The NME 120 may request the AP 110 to obtain and provide to the NME at least a portion of information stored in the MIB 175 of the WTRU 105. Once the AP 110 stores the information, the NME 120 may access the MIB 160, which now contains at least a portion of the contents of the MIB 175.

Figure 2:
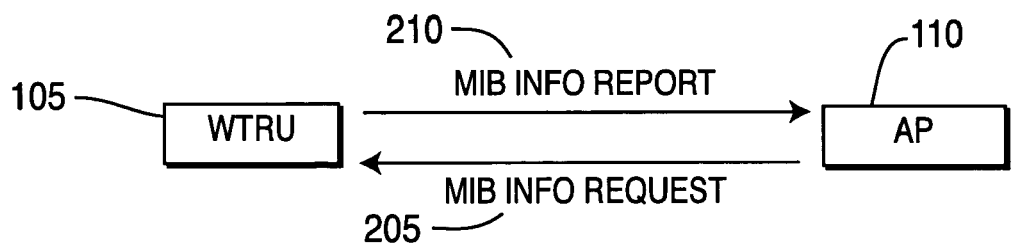
FIG. 2 is a signal flow diagram showing communication between a WTRU and an AP for obtaining MIB information in accordance with the present invention.

FIG. 2 illustrates a process which supports communication between a WTRU 105 and an AP 110 in order to obtain MIB data in accordance with the present invention. Once an AP 110 decides to retrieve MIB data from a target WTRU 105, the AP 110 transmits a MIB information request frame 205 to the target WTRU 105. The WTRU 105 compiles MIB data (stored in the second MIB 175) and transmits a MIB information report frame 210 to the AP 110.

Referring to FIGS. 1A and 1B, the process to initiate the retrieval of WTRU MIB contents can also be initiated by the NME 120, which in turn triggers the first management entity 150 in the AP 110 to send a primitive to the second management entity 155 to send a MAC signaling frame to the WTRU 105 and so on.

The MIB information report frame 210 is preferably generated as a new category of action frame. However, the MIB information report frame 210 may be generated as a new sub-type of management frame, or may comprise a new information element (IE) attached to either a management frame or an action frame that currently exists or will be developed in the future.

Figure 3:
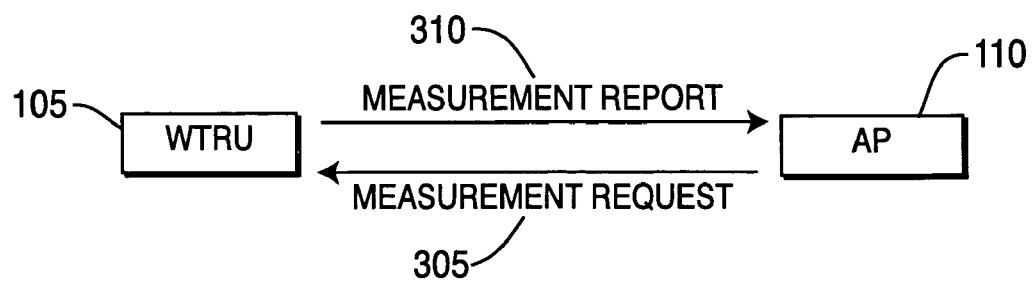
FIG. 3 is a signal flow diagram showing communication between a WTRU and an AP for requesting and receiving a measurement report in accordance with the present invention.

FIG. 3 illustrates a process which supports communication between a WTRU 105 and an AP 110 in order for the AP 110 to request a WTRU 105 to perform one or more measurements and report specific physical parameters of the WTRU 105 to the AP 110. Once an AP 110 decides to request physical measurement data from a WTRU 105, the AP 110 transmits a measurement request action frame 305 to a target WTRU 105 for measuring and reporting certain physical parameters of the target WTRU 105. The measurements may include transmit power, link margin, a clear channel assessment (CCA) report, received power indicator (RPI) histogram report, or any other physical related measurements. These may be absolute values, statistical averages or histogram values, or values that are calculated utilizing any type of algorithm or optimization routine. After performing the requested measurement, the target WTRU 105 compiles measurement data and transmits a measurement report action frame 310 to the AP 110. The measurement data is stored in the MIB 160 of the AP 110 and the MIB 175 of the WTRU 105.

The MIB 175 in the WTRU 105 stores two different categories of information. The first category includes a variety of physical measurements such as signal power, interference levels, noise histograms, or the like. The second category is a variety of MAC performance statistics such as CCA busy fractions, average back-off times, erroneous frame counters, or the like.

When the received physical measurement and MAC performance statistics are stored in the MIB 160 of the AP 110, it is made available to an entity which is responsible for RRM. The MIB 160 may be either a MAC MIB or a PHY MIB. A MAC MIB is preferred because RRM messaging is also performed in MAC layer, and it is much faster than PHY layer. These physical measurement data are made available to external entities by storing them in the MIB 160 of the AP 110. Thus, effective load control and BSS range adjustments become possible.

Figure 4:
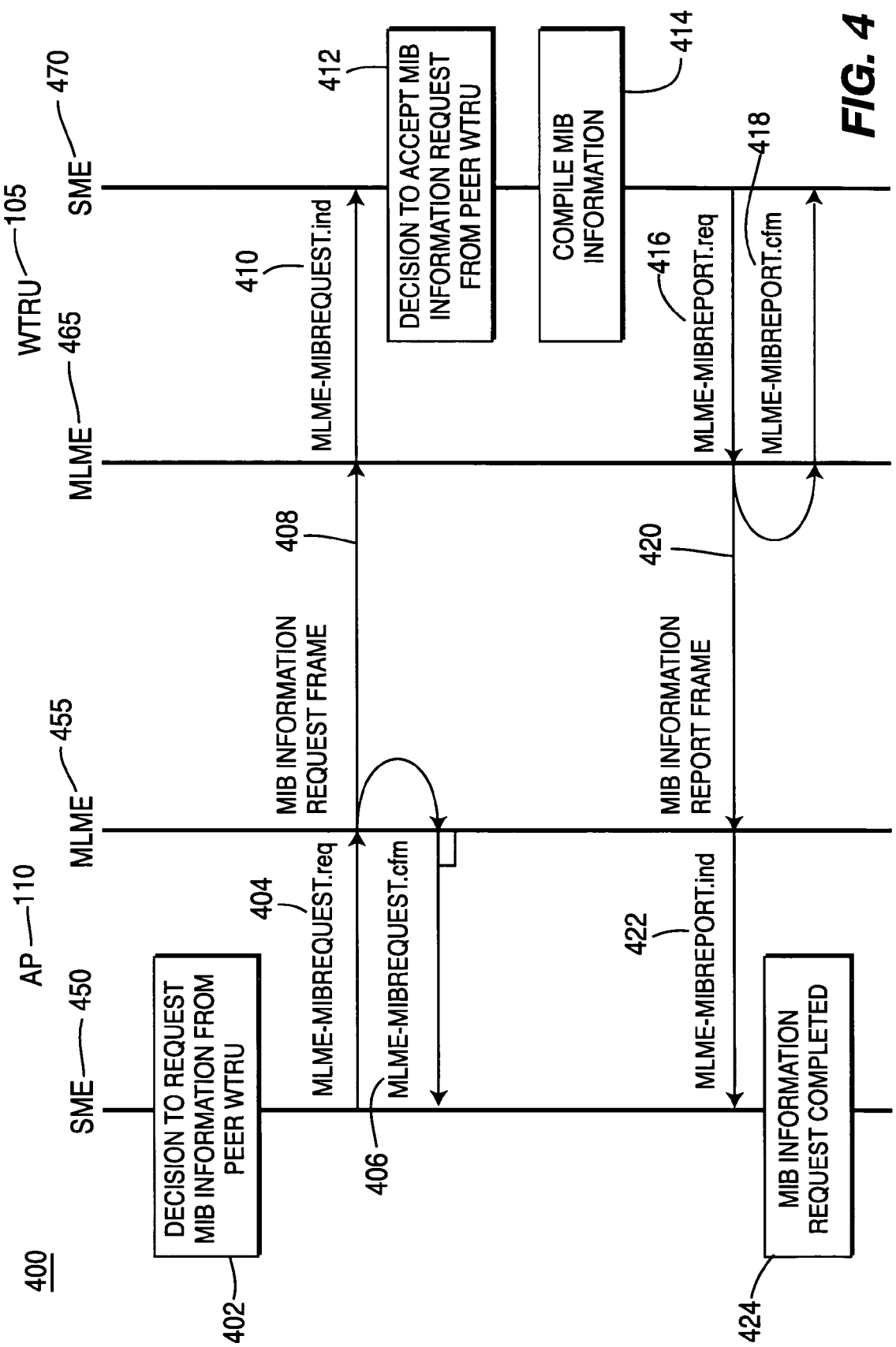
FIG. 4 is a signal flow diagram illustrating an exemplary process for transferring management information using service primitives between network management entities in accordance with the present invention.

FIG. 4 is a signal flow diagram illustrating an exemplary process 400 for obtaining MIB information using service primitives between an AP 110 and a WTRU 105. Internal messaging is performed with service primitives newly introduced by the present invention. Using process 400, an AP 110 may retrieve data stored in the MIB 175 of a WTRU 105 and store the retrieved data in the MIB 160 of the AP 110.

The AP 110 includes an SME 450 and an MLME 455. The WTRU 105 includes a MLME 465 and an SME 470. The SME 450 of the AP 110 determines whether or not to request MIB information from the WTRU 105 (step 402). In step 404, the SME 450 transmits a first message (MLME-MIBREQUEST.req) to the MLME 455 of the AP 110 requesting MIB information if the SME 450 determines in step 402 to request MIB information from the WTRU 105. In step 406, the MLME 455 transmits a second message (MLME-MIBREQUEST.cfm) to the SME 450 confirming receipt of the first message (MLME-MIBREQUEST.req). In step 408, the MLME 455 transmits a third message (MIB information request frame) to the target WTRU 105 requesting MIB information, and the MLME 465 of the target WTRU 105 receives the third message (MIB information request frame). In step 410, the MLME 465 transmits a fourth message (MLME-MIBREQUEST.ind) to the SME 470 in the target WTRU 105 requesting MIB information.

Still referring to FIG. 4, in step 412, the SME 470 determines whether or not to provide MIB information in response to the fourth message (MLME-MIBREQUEST.ind). Some of the decisions involved in step 412 may include whether or not the WTRU 105 has the MIB information elements that the AP requested. For some error conditions, the AP 110 may request MIB information that the WTRU 105 does not have stored in the MIB 175. Also, it may be desired to implement security checking process whereby, for example, if the WTRU 105 has reason to believe that the MIB information request is not coming from a valid, (i.e., authorized), AP 110, the SME 470 in the WTRU 105 may decide not to send the requested MIB information.

Still referring to FIG. 4, in step 414, the SME 470 compiles MIB information stored in the MIB 175 of WTRU 105, if the SME 470 determines to provide MIB information, (i.e., accepts the MIB information request), in step 412. In step 416, the SME 470 transmits a fifth message (MLME-MIBREPORT.req) to the MLME 465. In step 418, the MLME 465 transmits a sixth message (MLME-MIBREPORT.cfm) to the SME 470 confirming receipt of the fifth message (MLME-MIBREPORT.req). In step 420, the MLME 465 transmits a seventh message (MIB information report frame) including the requested information to the AP 110, and the MLME 455 of the AP 110 receives the seventh message (MIB information report frame). In step 422, the MLME 455 transmits an eighth message (MLME-MIBREPORT.ind) including the requested MIB information to the SME 450. The requested MIB information may be stored in the MIB 160 of the AP 110. The MIB information request is completed in step 424.

In accordance with the present invention, protection is provided for the contents of the MIB 160 of the WTRU 105 by prohibiting an entity outside of the WTRU 105 from directly reading the contents of the MIB 160. Signaling frames and related inter-layer primitives are exchanged between the layers in either the AP 110 or WTRU 105. MAC frames which directly carry specific MIB entries consisting of physical measurements and MAC performance statistics are used to build a WTRU-related MIB entry, thus forming a "peer table". In one alternate embodiment, measurements performed by the WTRU 105, such as signal strength measurements, may be transmitted from the WTRU 105 to the AP 110 via MAC frames and stored in the MIP 160 of the AP 110, without the WTRU 105 storing the measurements in its own MIP 175.

Data entries of the MIB are defined by IEEE 802.11 standards. However, the MIB currently defined under the IEEE 802.11 standards does not contain enough information to support WLAN RRM. Therefore, the present invention introduces an improved MIB data structure to assist the interworking of a WTRU 105 and an AP 110 in terms of WLAN RRM.

For example, Table 1, as shown below, includes a list of six (6) MIB tables containing RRM relevant information and one (1) MIB table containing PHY measurements in accordance with the present invention. In accordance with IEEE 802.11 standards, these tables are preferably contained within IEEE 802.11 RRM MIB and IEEE 802.11 PHY MIB, respectively. However, each of the MIB tables could be included as extensions of other existing IEEE 802.11 MIB tables, including but not limited to, 802.11 PHY, 802.11 MAC, and 802.11 SMT (station management).

TABLE 1

| MIB Table | Description |
| --- | --- |
| dot11peerPhyMeasTable | Peer PHY measurements |
| dot11BSSGlobalStatusTable | Association, authentication, roaming status of WTRUs in basic service set |
| dot11BSSGlobalStatisticsTable | MAC and PHY basic service set statistics and measurements |
| dot11BSSRrmConfigurationTable | Configuration of basic service set RRM parameters |
| dot11BSSRrmActionsTable | Interface for NME to force / prioritize actions; network monitoring tools |
| dot11peerCapabilityTable | Peer capabilities |
| dot11peerConfigurationTable | Peer configurations |

Peer physical layer measurements that are reported to or passively observable pertaining to a particular WTRU are written into the MIB dot11peerPhyMeasTable. This includes a BSS of the AP and its neighbors, as observed either by the AP itself or by the WTRUs. Examples of the BSS AP PhyMeas include a received signal strength indicator (RSSI) and a bit error rate (BER).

With respect to BSS global status, high level network information pertaining to association, roaming, authentication, and security status and history of all WTRUs are stored in MIB table dot11BSSGlobalStatusTable. Other examples include the number of WTRUs in the network, and the number of WTRUs that are sleeping.

MAC and PHY BSS statistics and AP measurements, such as load, congestion, interference, interference sources, and neighbors, are stored in MIB table dot11BSSGlobalStatisticsTable.

Overall BSS control configuration pertaining to RRM, such as how long an AP is to keep data in a MIB table and when to perform a particular task, is stored in MIB table dot11BSSRrmConfigurationTable.

A list of action items and network monitoring tools for external NMEs is contained in MIB table dot11BSSRrmActionsTable. The information stored in this MIB table acts as an interface for NMEs to force and prioritize WLAN actions.

Availability of peer features and capabilities is stored in a MIB dot11peerCapabilityTable. For example, information on whether a WTRU has two antennas is stored in the MIB table. In another example, information on whether a WTRU has encryption capability is stored in the MIB table.

Information regarding the actual configuration of the aforementioned peer features and capabilities is stored in MIB table dot11peerConfigurationTable. Using the example of a WTRU with encryption capability, the associated configuration is the ON/OFF status of the encryption feature.

With the above mentioned MIB tables containing RRM information relevant to the BSS, RRM information is distributed among a plurality of APs, WTRUs and NMEs.

Figure 5:
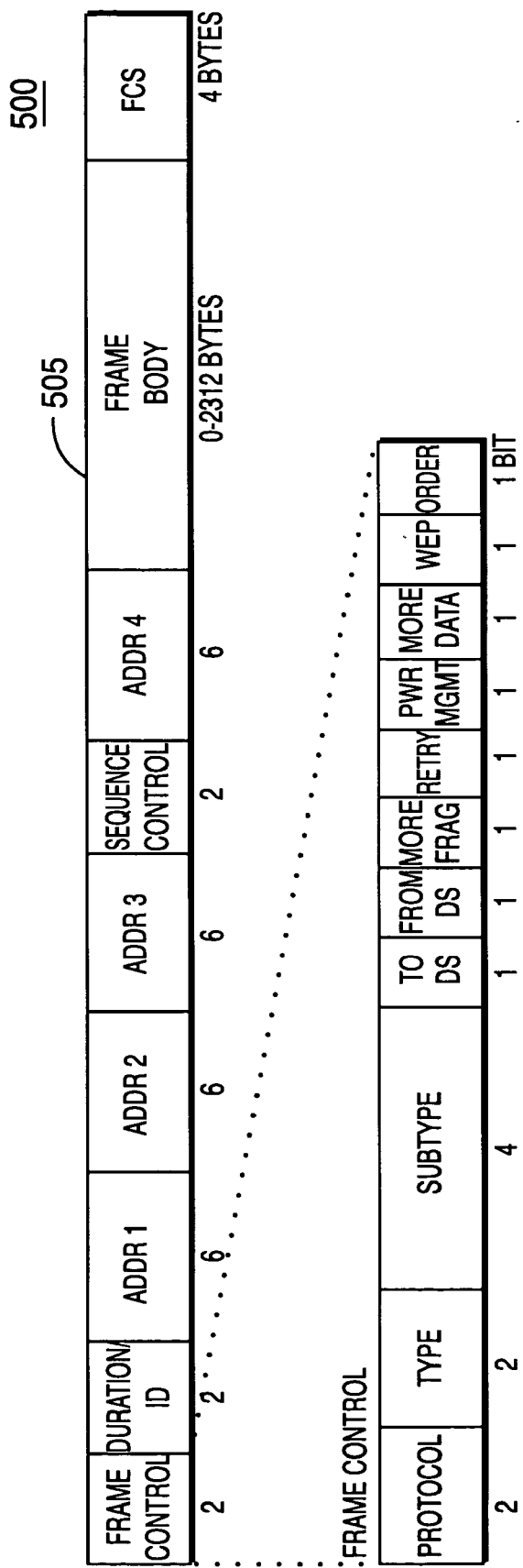
FIG. 5 shows exemplary MIB information action frames including a frame body in accordance with the present invention.

FIG. 5 shows an exemplary configuration of a MIB information frame 500 which includes a frame body field 505 in accordance with the present invention. The MIB information frame 500 is an action frame, (i.e., a MAC frame), but it should be understood that the format of MIB information frame 500 may be formatted as a management frame or information elements attached to either a management frame or an action frame.

The MIB information frame 500 includes type and the subtype fields which indicate the specific characteristics of MAC frame and how it should be processed. Data uses a different MAC frame type than management frames. A subtype field is used to differentiate different sorts of management frames. The MAC frame is used to retrieve MIB information from the WTRU 105.

Figure 6:
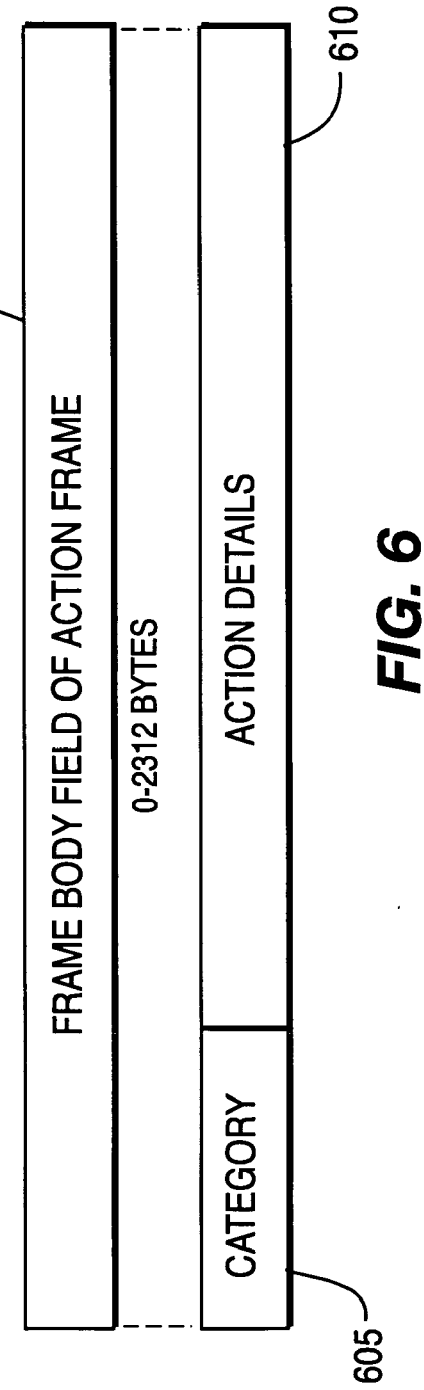
FIG. 6 shows the details of the frame body of the action frames of FIG. 5.

FIG. 6 shows that the frame body 505 of the MIB information frame 500 may include a category field 605 and an action details field 610. The category field 605 may include a MIB information category and indicates the specific characteristics of the frame 500 and how it should be processed. The action details field 610 includes action details which vary depending on the category field. For example, the action details field 610 may indicate specific frequencies to measure. A MIB request would typically specify which MIB entries should be reported back from the WTRU 105, e.g., only a specific table, only a particular value in a specific table, or the like.

Figure 7A:
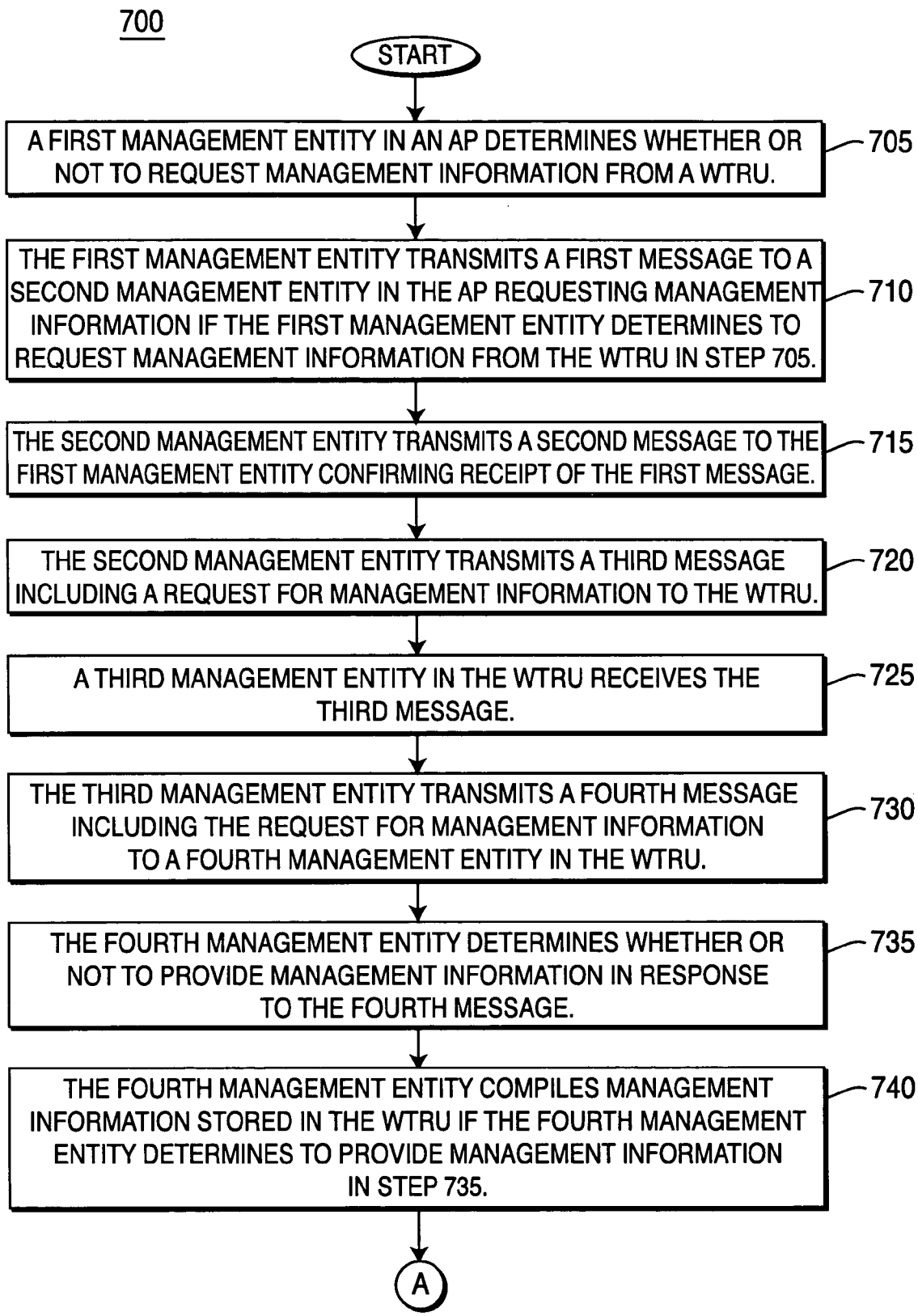
FIGS. 7A and 7B, taken together, is a flowchart of an exemplary process including method steps for transferring management information between network entities in accordance with the present invention.
Figure 7B:
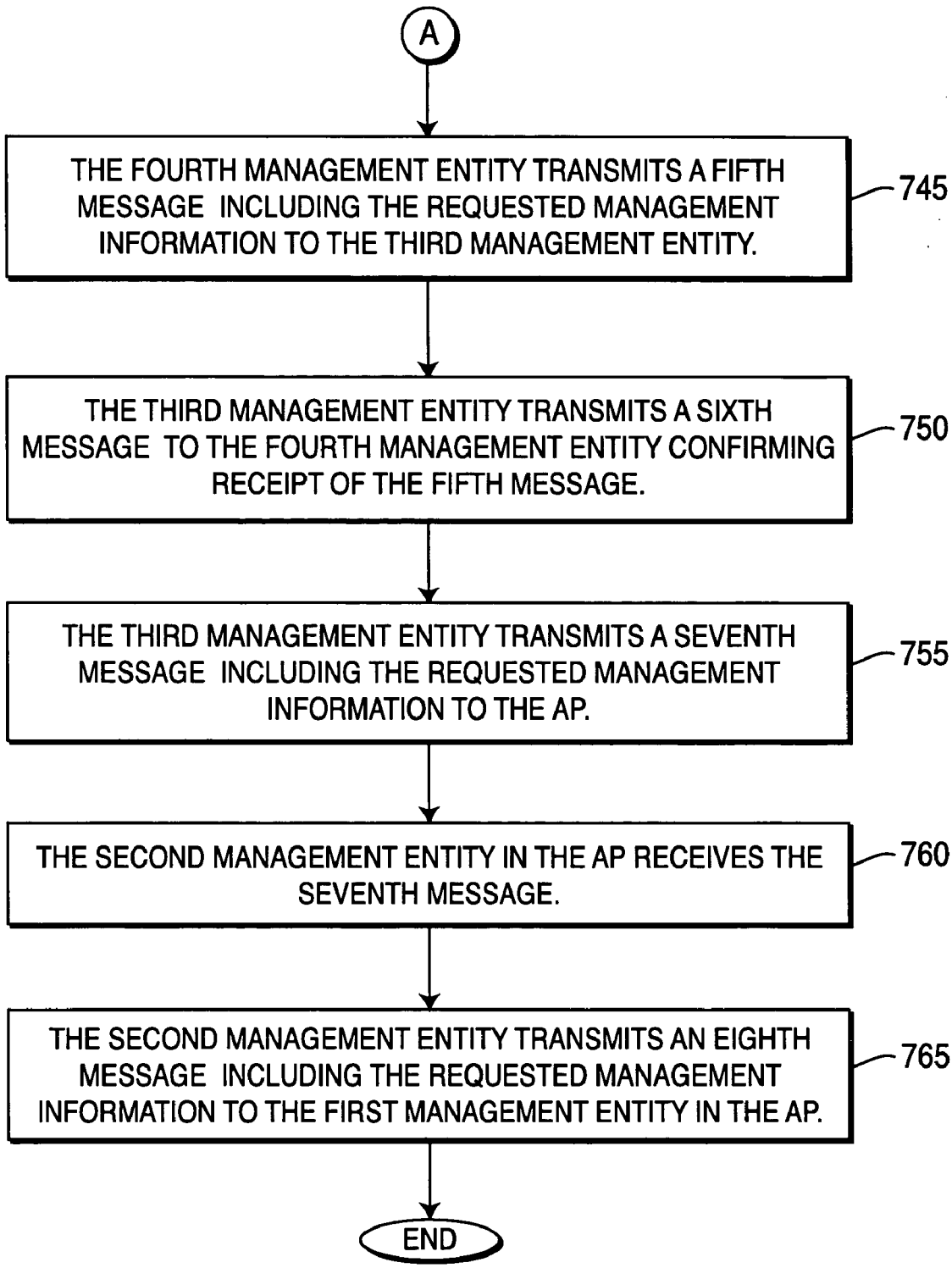

FIGS. 7A and 7B, taken together, is a flowchart of an exemplary process 700 including method steps for transferring management information between network entities in accordance with the present invention.

Process 700 is implemented in a wireless communication system 100 including at least one AP 110 and at least WTRU 105 (see FIG. 1A). As shown in FIG. 1B, the AP 110 includes a first management entity 150 and a second management entity 155. Furthermore, as shown in FIG. 1B, the WTRU 105 includes a third management entity 165 and a fourth management entity 170.

Referring to FIGS. 7A and 1B, the first management entity 150 in an AP 110 determines whether or not to request management information from the WTRU 105 (step 705). In step 710, the first management entity 150 transmits a first message to the second management entity 155 in the AP 110 requesting management information if the first management entity 150 determines to request management information from the WTRU 105 in step 705. In step 715, the second management entity 155 transmits a second message to the first management entity 150 confirming receipt of the first message. In step 720, the second management entity 155 transmits a third message including a request for management information to the WTRU 105. In step 725, the third management entity 165 in the WTRU 105 receives the third message. In step 730, the third management entity 165 transmits a fourth message including the request for management information to the fourth management entity 170 in the WTRU 105. In step 735, the fourth management entity 170 determines whether or not to provide management information stored in response to the fourth message. In step 740, the fourth management entity 170 compiles management information stored in the WTRU, (i.e., in the MIB 175), if the fourth management entity 170 determines to provide management information in step 735.

Referring now to FIGS. 7B and 1B, in step 745, the fourth management entity 170 transmits a fifth message including the requested management information to the third management entity 165. In step 750, the third management entity 165 transmits a sixth message to the fourth management entity 170 confirming receipt of the fifth message. In step 755, the third management entity 165 transmits a seventh message including the requested management information to the AP 110. In step 760, the second management entity 155 in the AP 110 receives the seventh message. In step 765, the second management entity 155 transmits an eighth message including the requested management information to the first management entity 150. The requested information may then be stored in the MIB 160 of the AP 110.

While this invention has been particularly shown and described with reference to preferred embodiments, it will be understood by those skilled in the art that various changes in form and details may be made therein without departing from the scope of the invention described hereinabove.

What is claimed is:

1. an access point (AP) comprising: a station management entity (SME); a medium access control (MAC) layer management entity (MLME) in communication with the SME; a radio resource management (RRM) management information base (MIB); and a transmitter; wherein the MLME is configured to transmit a first message to a wireless transmit/receive unit (WTRU), wherein the first message comprises a request for MIB information of the WTRU, receive a second message that comprises compiled MIB information of the WTRU, and communicate the compiled MIB information of the WTRU to the SME; wherein the SME is configured to communicate the compiled MIB information of the WTRU to the RRM MIB; wherein the RRM MIB is configured to store the compiled MIB information from the WTRU and configured to perform radio resource management functions using the stored MIB information; wherein the RRM MIB is further configured to receive a second request for the stored MIB information of the WTRU; and wherein the transmitter is configured to transmit the stored MIB information of the WTRU in response to the second request.

2. the AP of claim 1, wherein the first message comprises a MIB information request action frame that comprises a category field and an action details field.

3. the AP of claim 1, wherein the MLME is further configured to transmit a MIB information report action frame that comprises a category field and an action details field.

4. The AP of claim 1, wherein the AP is configured to operate within a wireless local area network (WLAN).

5. a method for use in a wireless transmit/receive unit (WTRU), the method comprising: receiving, at a medium access control (MAC) layer management entity (MLME) of the WTRU, a first message that comprises a request for management information base (MIB) information of the WTRU; determining whether to provide the MIB information to an access point (AP); in response to determining whether to provide the MIB information to the AP, compiling, at a station management entity (SME) of the WTRU, MIB information stored in a radio resource management (RRM) MIB; and transmitting, from the WTRU to the AP, a second message that comprises compiled MIB information of the WTRU for storage in an RRM MIB of the AP.

6. The method of claim 5, wherein the first message comprises a MIB information request action frame that comprises a category field and an action details field.

7. The method of claim 5, wherein the second message comprises a MIB information report action frame that comprises a category field and an action details field.

8. a wireless transmit/receive unit (WTRU) comprising: a station management entity (SME); and a medium access control (MAC) layer management entity (MLME) in communication with the SME; and a transmitter; wherein the MLME is configured to receive a first message that comprises a request for management information base (MIB) information of the WTRU and communicate the first message to the SME; wherein the SME is configured to compile MIB information of the WTRU and communicate the compiled MIB information of the WTRU to the MLME; and wherein the transmitter is configured to transmit, from the WTRU to an access point (AP), a second message that comprises the compiled MIB information of the WTRU for storage in a radio resource management (RRM) MIB of the AP.

9. The WTRU of claim 8, wherein the second message comprises a MIB information request action frame that comprises a category field and an action details field.

10. The WTRU of claim 8, wherein the MLME is further configured to transmit a third message that comprises a MIB information report action frame that comprises a category field and an action details field.

11. a method for use in an access point (AP), the method comprising: transmitting, from a medium access control (MAC) layer management entity (MLME) of the AP, a first message that comprises a first request for management information base (MIB) information of a wireless transmit/receive unit (WTRU); receiving, at the MLME of the AP, a second message in response to the first message, wherein the second message includes compiled MIB information from the WTRU; communicating, from the MLME to the SME, the compiled MIB information of the WTRU; storing the compiled MIB information of the WTRU in a radio resource management (RRM) MIB of the AP; receiving, at the RRM MIB of the AP, a second request for the stored MIB information of the WTRU; and transmitting the stored MIB information of the WTRU in response to the second request.

12. The method of claim 11, wherein the first message comprises a MIB information request action frame that comprises a category field and an action details field.

13. The method of claim 11 wherein the second message comprises a MIB information report action frame that comprises a category field and an action details field.

* * * * *

UNITED STATES PATENT AND TRADEMARK OFFICE
CERTIFICATE OF CORRECTION

PATENT NO. : 8,121,098 B2  
APPLICATION NO. : 10/890571  
DATED : February 21, 2012  
INVENTOR(S) : Rudolf et al.

Page 1 of 1

It is certified that error appears in the above-identified patent and that said Letters Patent is hereby corrected as shown below:

ON THE TITLE PAGE

At Item (56), OTHER PUBLICATIONS, page 2, left column, in the fifty-ninth line, after "band in Europe."", delete "P802.11/D3" and insert --P802.11h/D3--.

At Item (56), OTHER PUBLICATIONS, page 2, left column, in the sixty-fourth line, after "ANSI/IEEE std", delete "802.111" and insert --802.11--.

At Item (56), OTHER PUBLICATIONS, page 3, left column, in the fifth line, after "802.11/D0.15, Jun.", delete "2003" and insert --2004--.

IN THE CLAIMS

At Claim 1, column 8, line 29, before "access", delete "an" and insert --An--.

At Claim 2, column 8, line 49, before "AP of claim", delete "the" and insert --The--.

At Claim 3, column 8, line 52, before "AP of claim", delete "the" and insert --The--.

At Claim 5, column 8, line 57, before "method for", delete "a" and insert --A--.

At Claim 8, column 9, line 9, before "wireless transmit/receive unit", delete "a" and insert --A--.

At Claim 11, column 10, line 5, before "method for", delete "a" and insert --A--.

Signed and Sealed this  
Ninth Day of April, 2013

Teresa Stanek Rea  
*Acting Director of the United States Patent and Trademark Office*